(No Model.)  2 Sheets—Sheet 1.

W. NERACHER.
DAMPER.

No. 261,476.  Patented July 18, 1882.

Witnesses
Walter Donaldson
F. L. Middleton

Inventor
William Neracher
by Ellis Shear
Atty.

N. PETERS, Photo-Lithographer, Washington, D. C.

(No Model.) 2 Sheets—Sheet 2.
W. NERACHER.
DAMPER.
No. 261,476. Patented July 18, 1882.
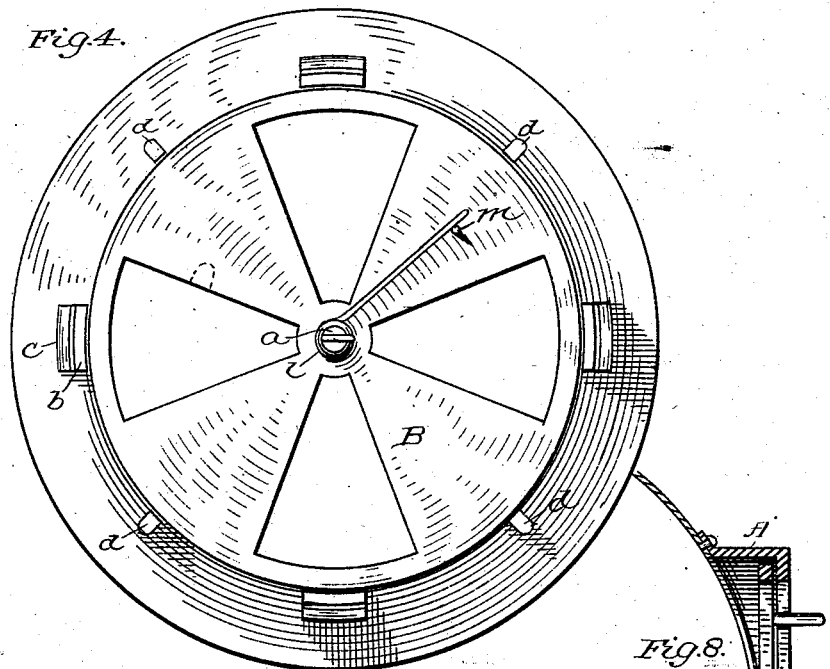
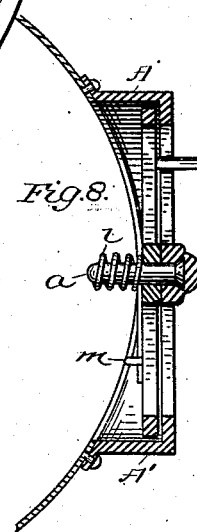
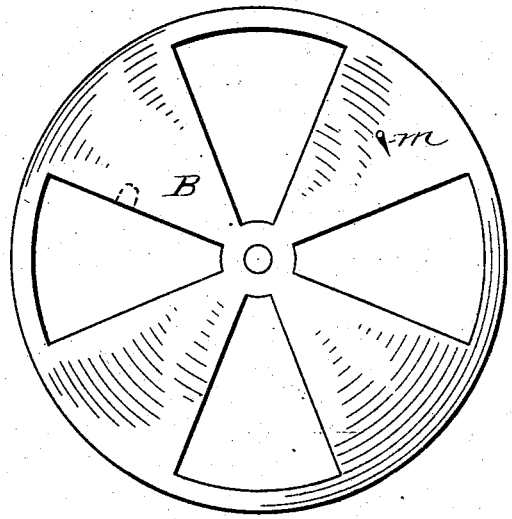
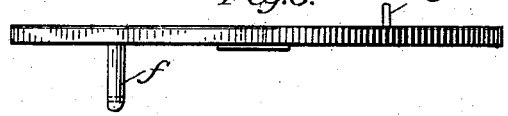
Witnesses
Walter Donaldson
F. L. Middleton
Inventor
William Neracher
by Ellis Spear
Atty.

UNITED STATES PATENT OFFICE.

WILLIAM NERACHER, OF CLEVELAND, OHIO.

DAMPER.

SPECIFICATION forming part of Letters Patent No. 261,476, dated July 18, 1882.

Application filed March 9, 1882. (No model.)

*To all whom it may concern:*

Be it known that I, WILLIAM NERACHER, of Cleveland, in the county of Cuyahoga and State of Ohio, have invented a new and useful Improvement in Dampers; and I do hereby declare that the following is a full, clear, and exact description of the same.

My invention relates to valves for draft-regulators or ventilators.

It consists, first, of a special construction of the valve and valve-closing devices, and in the second place of devices whereby the valve is adapted to be readily applied to an ordinary pipe.

Figure 1:
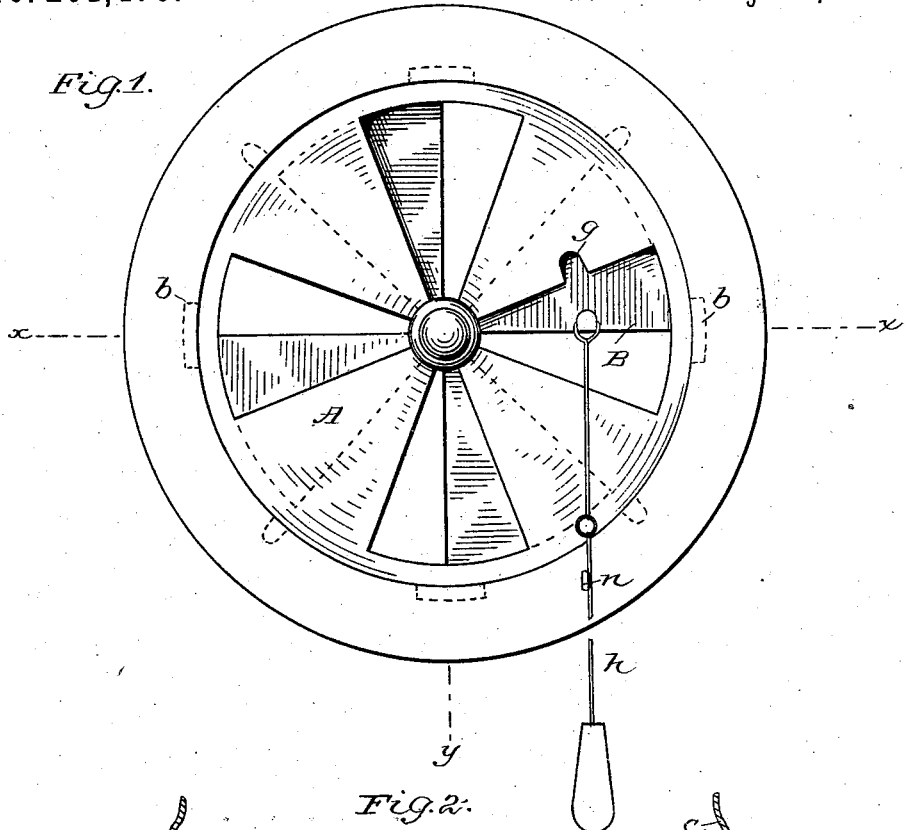
Figure 2:
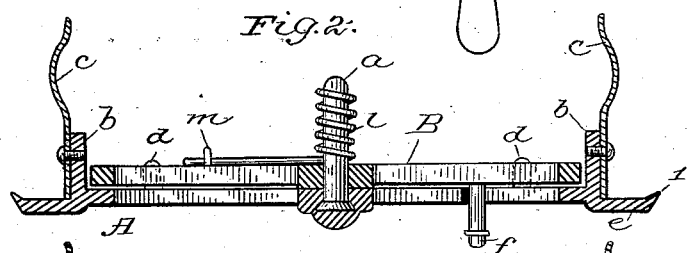

In the accompanying drawings, Figure 1 shows a plan view of the valve partly open. Fig. 2 represents a section on line $x\ x$, and Fig. 3 a section on line $y\ y$, of Fig. 1. Fig. 4 shows the plate and valve-seat in plan, and Fig. 5 a like view of the valve. Fig. 6 is an edge view of the valve detached; Fig. 7, a part of the plate, showing the particular lug. Fig. 8 shows a modification of the valve-seat applicable to the side of a pipe.

In these drawings, A represents the valve seat or plate. It may be cast in the ordinary manner, and, if desired, nickel-plated or coated in any of the well-known ways to give it an ornamental appearance. It is in casting provided with a pin, $a$, projecting inwardly, the head of which is preferably within a boss in the center of the plate, in order that the other parts may be made thinner. This plate is cast with lugs $b\ b$, preferably four in number, as shown in Fig. 1. They are set at right angles to the plate, and to them are riveted bent yielding springs $c\ c$. The flanges are set so as to fit inside of the pipe, for which the ventilator is intended; but the springs $c\ c$ bow outwardly a little beyond the diameter of the pipe, so that when they are inserted they are under compression, and thereby hold the ventilator in place.

In order to prevent any undue sagging of the ventilator by reason of the yielding of the springs upon the lower side, I provide small lugs $d$ upon the seat A, adapted to fit snugly within the pipe when the ventilator is in place. These lugs are shown in Figs. 1, 2, 3, and 4, and also in Fig. 7.

The plate A is extended in the form of a flange, $e$, designed to overlap the opening or end of the pipe, to which the ventilator is applied, and a turned-up edge, 1, bears against the wall to form a close joint.

The valve B is a disk, having openings adapted to register with those in the seat in the ordinary manner, and it is pivoted upon the pin $a$, so as to turn freely thereon.

Figure 3:
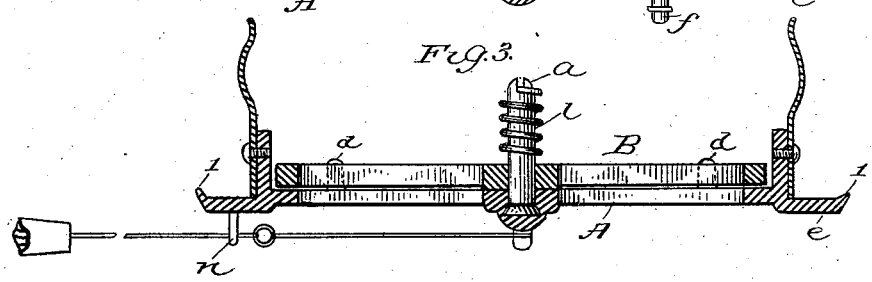

A pin, $f$, is fixed to the edge of one of the leaves, as shown in Figs. 2, 5, and 6, and in place in Fig. 2. When the valve is open this pin fits into a notch, $g$, in the valve-seat, thereby limiting the movement of the valve in that direction. The face of the pin bears against the opposite edge and forms the other limit of movement. A rod or wire, $h$, is attached to this pin, by which the valve may be moved. The pin $a$ projects inwardly beyond the valve, and is split at its end, as shown in Fig. 3. Upon this pin I place a spring, $l$, its coil encircling the pin, with the end of the coil placed in the slit in the end thereof. The lips of the slitted end may be forced inward to clamp the end of the spring and hold it in place. The other end of the spring is extended, and bears against a small pin, $m$, on the valve, and the spring is adjusted so as to hold the valve in an open position, except when force is applied to the rod or wire $k$.

In order to retain the valve in a closed position, I have provided a pin, $n$, on the edge of the valve-plate, over which a loop in the wire $k$ is adapted to hook when the valve is closed. This may be hooked or unhooked by manipulating the wire $k$, even when the valve is placed at a considerable height in the room.

The spring $l$ serves the additional purpose of holding the valve in place, preventing it from slipping over the pin.

In Fig. 8 I have shown a modification of the valve plate or seat. In this figure the seat A', instead of being formed with the lugs $b$ and springs $c$, is cast with a curved inner flange, the curve being adapted to fit against the side of a pipe when it is desirable so to place the said valve. The valve, when so placed, may be riveted to the pipe, the pipe having a hole cut in its side for the admission of the air, and operate in the manner hereinbefore explained.

Having thus described my invention, what I claim is—

1. The combination of the valve plate or seat A, the valve B, the spring $l$, and the wire $h$, provided with a loop or equivalent device adapted to hold the valve closed against the force of the spring, as set forth.

2. The combination of the valve seat or plate A, the valve B, the pin $a$, slitted at its end, the spring $l$, and the pin $m$, substantially as described.

3. Combined with the valve-seat adapted to fit an opening, and having springs $c$, the lugs $d\ d$ on such seat, adapted to bear on the edge of the opening.

In testimony whereof I have signed my name to this specification in the presence of two subscribing witnesses.

WILLIAM NERACHER.

Witnesses:
F. L. MIDDLETON,
E. A. DICK.